(12) United States Patent
Klein et al.

(10) Patent No.: US 10,140,090 B2
(45) Date of Patent: Nov. 27, 2018

(54) COMPUTING AND SUMMING UP MULTIPLE PRODUCTS IN A SINGLE MULTIPLIER

(71) Applicant: International Business Machines Corporation, Armonk, NY (US)

(72) Inventors: Michael Klein, Schoenaich (DE); Manuela Niekisch, Gechingen (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/278,206

(22) Filed: Sep. 28, 2016

(65) Prior Publication Data

US 2018/0088905 A1 Mar. 29, 2018

(51) Int. Cl.
*G06F 7/44* (2006.01)
(52) U.S. Cl.
CPC .......... *G06F 7/443* (2013.01); *G06F 2207/38* (2013.01)
(58) Field of Classification Search
CPC ..... G06F 7/38; G06F 7/42; G06F 7/44; G06F 7/48; G06F 7/49; G06F 7/47; G06F 7/50;
(Continued)

(56) References Cited

U.S. PATENT DOCUMENTS 5,847,981 A * 12/1998 Kelley .................. G06F 7/5443
708/523
6,611,856 B1 * 8/2003 Liao ..................... G06F 7/5443
708/523

(Continued)

FOREIGN PATENT DOCUMENTS

JP          5273866 B2    8/2013
WO       2013044276 A1    4/2013

OTHER PUBLICATIONS

Santoro, Mark R., Design and Clocking of VLSI Multipliers, 1989, Computer Systems Laboratory, Departments of Electrical Engineering and Computer Science, Stanford University, Technical REport No. CSL-TR-89-397, 129 pages.*
Dull et al., "High-speed Curve25519 on 8-bit, 16-bit, and 32-bit microcontrollers", Designs, Code and Cryptography, Dec. 2015, vol. 77, Issue 2, pp. 493-514.

(Continued)

*Primary Examiner* — Andrew Caldwell
*Assistant Examiner* — Emily E Larocque
(74) *Attorney, Agent, or Firm* — Cantor Colburn LLP; Steven Chiu (57) ABSTRACT

Methods, systems and computer program products for computing and summing up multiple products in a single multiplier are provided. Aspects include receiving a first number and a second number, creating partial products of the first number and the second number based on a multiplication of the first number and the second number, and reducing the number of partial products to create an intermediate result. Aspects also include receiving a third number and a fourth number, creating partial products of the third number and the fourth number based on a multiplication of the third number and the fourth number, creating a reduction tree and adding the intermediate result to the reduction tree. Aspects further include reducing the number of partial products in the reduction tree to create a second sum value and a second carry value and adding the second sum value and the second carry value to create a result.

9 Claims, 4 Drawing Sheets

(58) Field of Classification Search
CPC ... G06F 7/52; G06F 7/53; G06F 7/443; G06F 7/446; G06F 7/483; G06F 7/485; G06F 7/487; G06F 7/486; G06F 7/491; G06F 7/492; G06F 7/493; G06F 7/494; G06F 7/496; G06F 7/498; G06F 7/4824; G06F 7/4876; G06F 7/4912; G06F 7/4915; G06F 7/4925; G06F 7/4981; G06F 7/4983; G06F 7/4985; G06F 7/501; G06F 7/502; G06F 7/523; G06F 7/533; G06F 7/544; G06F 7/5016; G06F 7/5312; G06F 7/5332; G06F 7/5443; G06F 7/5306; G06F 7/5318; G06F 7/57; G06F 7/575
USPC ............... 708/490–494, 517–530, 541–550, 708/603–620
See application file for complete search history.

(56) References Cited

U.S. PATENT DOCUMENTS

| | | | |
|---|---|---|---|
| 7,627,625 | B2 | 12/2009 | Hubert |
| 8,244,790 | B2 | 8/2012 | Satoh et al. |
| 8,645,450 | B1* | 2/2014 | Choe ................. G06F 7/483 |
| | | | 708/523 |
| 9,274,751 | B2 | 3/2016 | Belluomini et al. |
| 2002/0040379 | A1* | 4/2002 | Amer ................. G06F 7/5324 |
| | | | 708/523 |

OTHER PUBLICATIONS

Hutter et al., "Fast Multi-precision Multiplication for Public-Key Cryptography on Embedded Microprocessors", CHES 2011, vol. 6917 of the series Lecture Notes in Computer Science, pp. 459-474.

* cited by examiner

COMPUTING AND SUMMING UP MULTIPLE PRODUCTS IN A SINGLE MULTIPLIER

BACKGROUND

The present invention generally relates to binary multiplication, and more particularly to methods and systems for computing and summing up multiple products in a single multiplier.

As electronic communication continues to proliferate, fast and strong encryption is becoming a very important topic. Most encryption schemes, including RSA and elliptic curve cryptography (ECC), rely on very long integer multiplications to encode and decode information. Currently, most strong encryption algorithms rely on 2048-bit integer multiplication. Blockchain technologies that rely on fast and strong encryption are rapidly becoming a very important topic for a lot of companies and businesses.

In order to perform multiplication of very long integers, the multiplicands are split into smaller chunks, which are then multiplied with each other to obtain the intermediate products. Once the intermediate products are calculated, they are then added together to get the final result. This process of obtaining multiple intermediate products and adding them together is time-consuming and a more efficient manner of performing long integer multiplication is needed.

SUMMARY

In accordance with an embodiment, a computer-implemented method for computing and summing up multiple products in a single multiplier is provided. The method includes receiving, by a multiplier circuit, a first number and a second number, creating, by the multiplier circuit, partial products of the first number and the second number based on a multiplication of the first number and the second number. The method also includes reducing, by a reduction circuit, the number of partial products to create an intermediate result having a first sum value and a first carry value. The method also includes receiving, by the multiplier circuit, a third number and a fourth number, creating, by the multiplier circuit, partial products of the third number and the fourth number based on a multiplication of the third number and the fourth number. The method further includes creating, by the multiplier circuit, a reduction tree by adding the intermediate result, the first sum value and the first carry value. The method further includes reducing, by the reduction circuit, a number of partial products in the reduction tree to create a second sum value and a second carry value and adding, by an adder circuit, the second sum value and the second carry value to create a result.

In another embodiment of the invention, a multiplier for computing and summing up multiple products includes a multiplier circuit that receives, during a first clock cycle, a first number and a second number and calculates partial products based on a multiplication of the first number and the second number. The multiplier also includes a reduction circuit that reduces the partial products to create an intermediate result having a first sum value and a first carry value. The multiplier circuit receives, during a second clock cycle, a third number and a fourth number calculates partial products based on a multiplication of the third number and the fourth number and adds the intermediate result, the first sum value and the first carry value, to the partial products of the third number and the fourth number to create a reduction tree. The reduction circuit reduces the reduction tree to a two-level tree resulting in a second sum value and a second carry value. The multiplier further includes an adder circuit that adds the second sum value and the second carry value to create a result.

In accordance with a further embodiment, a multiplier for computing and summing up multiple products includes a Booth multiplier circuit that receives, during a first clock cycle, a first number and a second number and to responsively create partial products based on a multiplication of the first number and the second number. The multiplier also includes a reduction circuit that reduces the partial products to create an intermediate result which includes a first sum value and a first carry value, wherein the Booth multiplier circuit includes logic to count and remove carry bits added by the Booth Multiplier during the creation of the partial products. The Booth multiplier circuit receives, during a second clock cycle, the intermediate result, a third number and a fourth number and calculates partial products based on a multiplication of the third number and the fourth number and adds the intermediate result, the first sum value and the first carry value, to the partial products of the third number and the fourth number to create a reduction tree. The reduction circuit reduces the reduction tree to a two-level tree resulting in a second sum value and a second carry value. The multiplier further includes an adder circuit that adds the second sum value and the second carry value to create a result.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Embodiments include methods, systems, and computer program products for computing and summing up multiple products in a single multiplier. In exemplary embodiments, a method for computing and summing up multiple products in a single multiplier includes receiving a first number and a second number to be multiplied. A multiplier circuit calculates the partial products of the first number and the second number. Next, the partial products are placed into a reduction tree that is reduced to create an intermediate result, which includes a first sum value and a first carry value. The first carry value and the first sum value are redundant number representations of the first product of the first number and the second number.

Next, the multiplier circuit also receives a third number and fourth number and calculates the partial products from the third number and the fourth number. The partial products from the third number and the fourth number are then combined with first sum value and the first carry value. The partial products from the third number and the fourth number and the first sum value and the first carry value are then reduced to create a second sum value and a second carry value. Next, the second sum value and the second carry value are then provided to an adder circuit, which adds the two values to create a final result.

In exemplary embodiments, the first, second, third and fourth numbers provided to the multiplier may be portions of larger numbers. For example, the first and third numbers can be 64-bit numbers that are high and low portions of a 128-bit number and the second and fourth numbers can be 64-bit numbers that are high and low portions of another 128-bit number.

Figure 1:
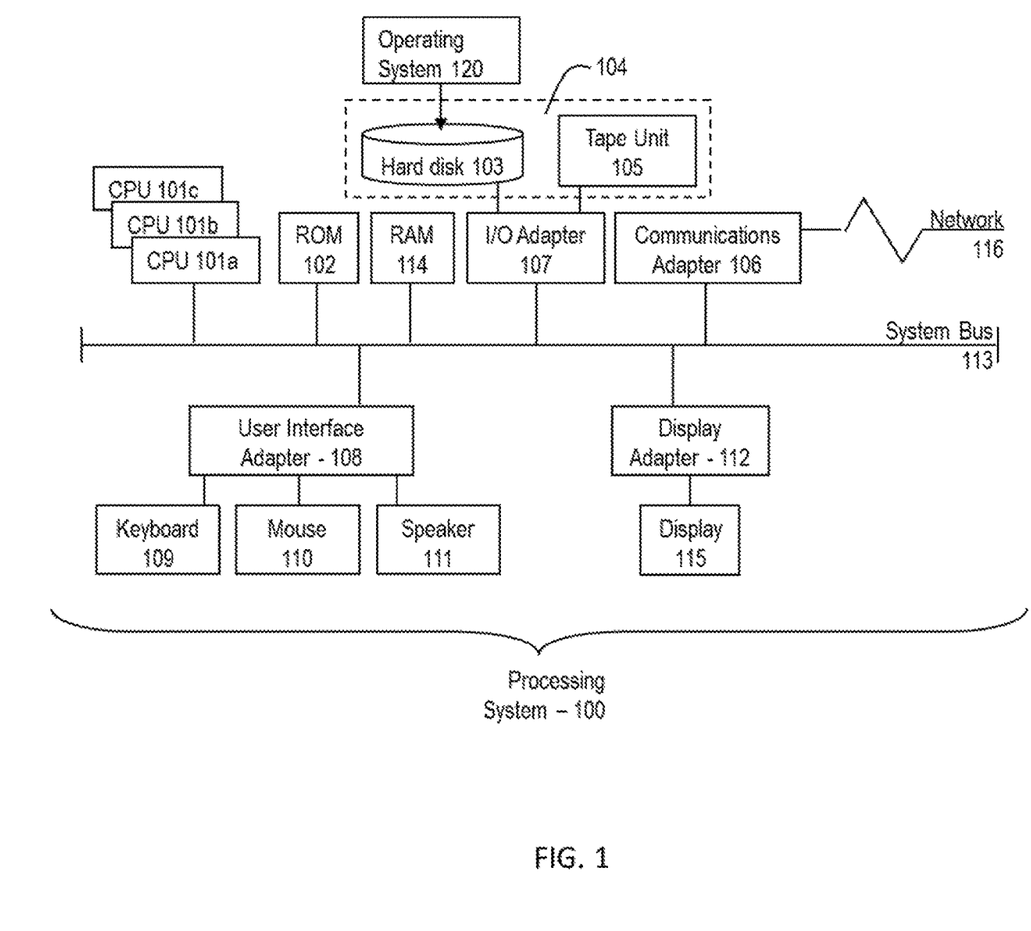
FIG. 1 is a block diagram illustrating one example of a processing system for practice of the teachings herein.

Referring to FIG. 1, there is shown an embodiment of a processing system 100 for implementing the teachings herein. In this embodiment, the system 100 has one or more central processing units (processors) 101a, 101b, 101c, etc. (collectively or generically referred to as processor(s) 101). Processors 101 are coupled to system memory 114 and various other components via a system bus 113. Read only memory (ROM) 102 is coupled to the system bus 113 and may include a basic input/output system (BIOS), which controls certain basic functions of system 100.

FIG. 1 further depicts an input/output (I/O) adapter 107 and a network adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. Operating system 120 for execution on the processing system 100 may be stored in mass storage 104. A network adapter 106 interconnects bus 113 with an outside network 116 enabling data processing system 100 to communicate with other such systems. A screen (e.g., a display monitor) 115 is connected to system bus 113 by display adaptor 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

Thus, as configured in FIG. 1, the processing system 100 includes processing capability in the form of processors 101, storage capability including the system memory 114 and mass storage 104, input means such as keyboard 109 and mouse 110, and output capability including speaker 111 and display 115. In one embodiment, a portion of system memory 114 and mass storage 104 collectively store an operating system to coordinate the functions of the various components shown in FIG. 1.

Implementing a multiplier in hardware is highly constrained by area and power. Accordingly, a good tradeoff between these two that is commonly used is a multiplier supporting 64-bit numbers as input operands. Using such a multiplier to multiply two large binary numbers, such as 128-bit integers, the multiplicands are split into smaller chunks which are then multiplied with each other to obtain intermediate products. Those intermediate products are then added together to get the final result. For example, in order to multiply two 128-bit numbers AB×CD, where A,B,C and D are 64-bit integers, one existing method would include:

Set result[0:3] to zero, result[x] is 64-bit number;
Compute B×D low 64 bits, store in result[3];
Compute B×D high 64 bits, store as carry_1;
Compute (A×D+carry_1) low 64 bits, store in result[2];
Compute (A×D+carry_1) high 64 bits, store in result[1];
Compute (B×C+result[2]) low 64 bits, store in result[2];
Compute (B×C+result[2]) high 64 bits, store as carry_2;
Compute (A×C+result[1]+carry_2) low 64 bits, store in result[1]; and
Compute (A×C+result[1]+carry_2) high 64 bits, store in result[0].

Figure 2:
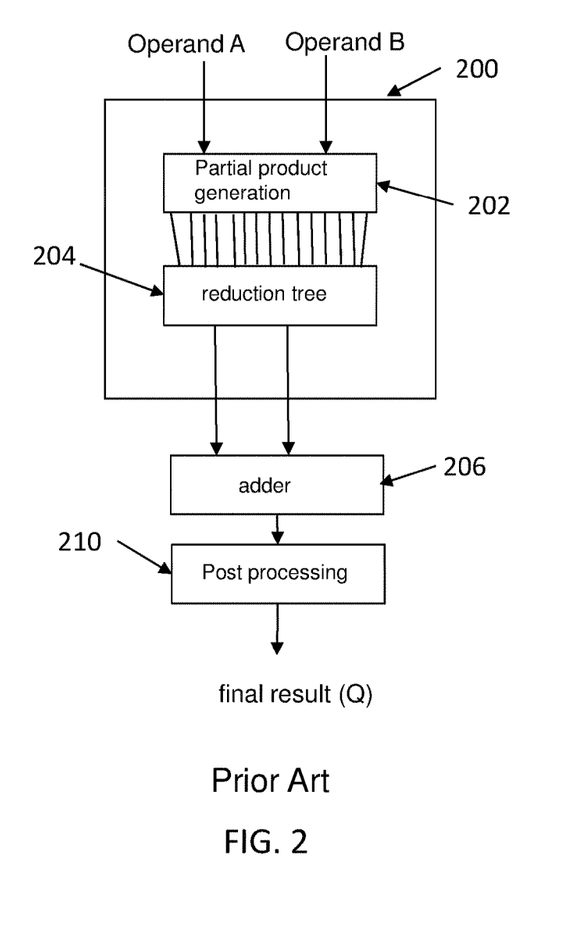
FIG. 2 is a block diagram illustrating a multiplier implemented in hardware.
Figure 3:
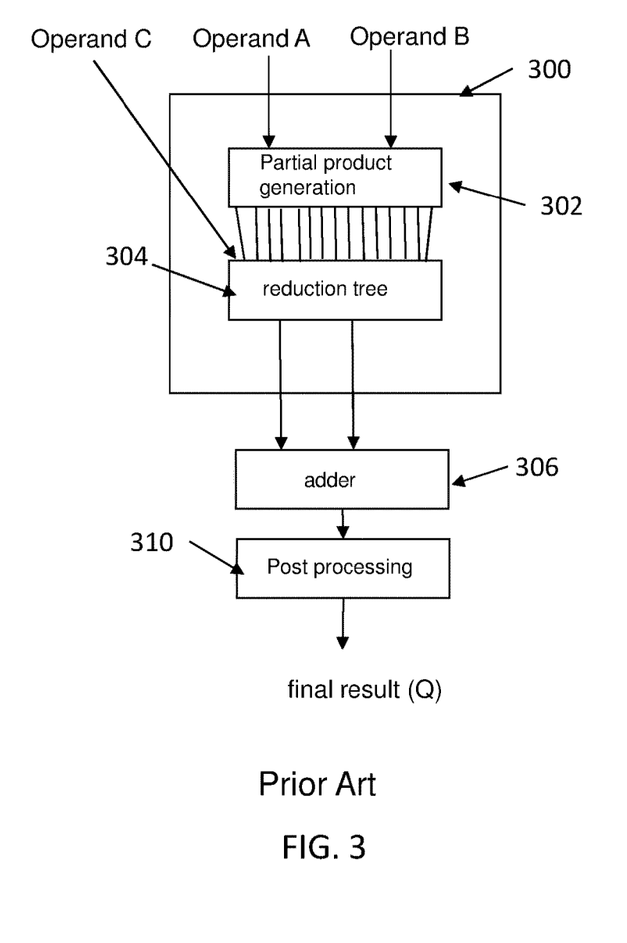
FIG. 3 is a block diagram illustrating a multiply-adder implemented in hardware.

Currently, this type of multiplication can be performed in hardware, using designs like shown in FIG. 2 and FIG. 3, by creating and reducing the partial products in a tree structure to create an intermediate result consisting of two terms, which is the redundant number representation of the final result. These two terms are then added by an adder circuit to create the final result. An algorithm that performs this type of multiplication will wait for each intermediate product computation to be finished before being able to add them together, which causes significant delay. Thus, reducing the latency in the process is of high value.

FIG. 2 illustrates a multiplier 200 implemented in hardware. The multiplier 200 is configured to calculate a result Q that is the product of A×B (Q=A×B). The multiplier 200 includes a partial product generation circuit 202 that receives operands A and B and create the partial products of A multiplied by B. The multiplier 200 also includes a reduction circuit 204 that receives the partial products of A multiplied by B and reduces the partial products to a sum value and a carry value. The multiplier 200 also includes an adder circuit 206 that receives and adds the sum value and the carry value to create the result Q. Finally, the multiplier 200 can further include a post processing circuit 210 that can perform additional processing on the result.

FIG. 3 illustrates a multiply-adder 300 implemented in hardware. The multiply-adder 300 is configured to calculate a result Q that is equal to the product of A and B plus C (Q=A×B+C). The multiply-adder 300 includes a partial product generation circuit 302 that receives operands A and B and create the partial products of A multiplied by B. The multiply-adder 300 also includes a reduction circuit 304 that receives the partial products of A multiplied by B and the operand C and reduces the partial products and operand C to a sum value and a carry value. The multiply-adder 300 also includes an adder circuit 306 that receives and adds the sum value and the carry value to create the result Q. Finally, the multiply-adder 300 can further include a post processing circuit 310 that can perform additional processing on the result.

Figure 4:
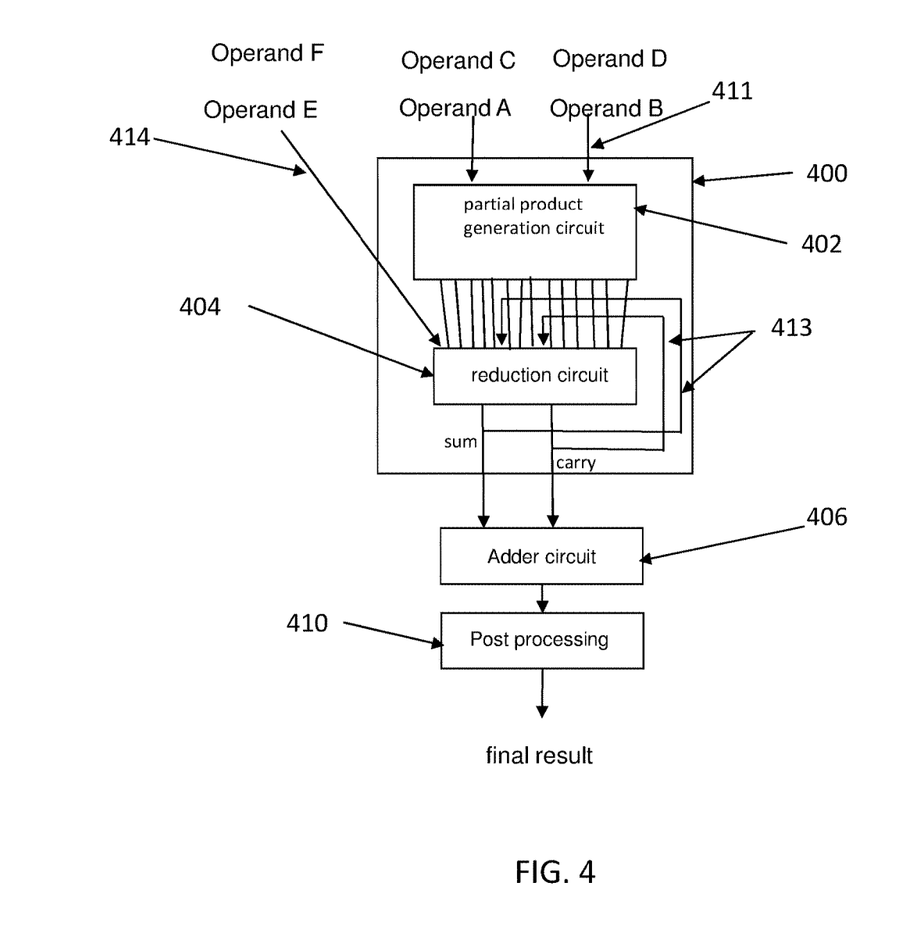
FIG. 4 is a block diagram illustrating a multiplier for computing and summing up multiple products in accordance with an embodiment.

Referring now to FIG. 4, there is shown a multiplier 400 for computing and summing up multiple products in accordance with an embodiment. In exemplary embodiments, the multiplier 400 includes a multiplier circuit 402, also referred to as a partial products generation circuit, that receives two times two input signals A, B and C, D 411 that are numbers to be multiplied. In one embodiment, the two pairs of input signals are received in two consecutive clock cycles and during each clock cycle, one pair of e.g. 64-bit numbers that may be one-half of 128-bit numbers that will be multiplied are received. The multiplier circuit 402 calculates the partial products based on the multiplication of the first two numbers (A and B) and transmits the partial products to the reduction circuit 404.

In exemplary embodiments, an additional operand E, which may be the result of another multiplication, is received and will be added to the product of A and B. Operand E is directly added to the reduction circuit 404 and reduced together with the partial products of A×B. After the partial products of A×B are calculated, the reduction circuit 404 reduces the reduction tree to create an intermediate result 413, which includes a first sum value and a first carry value. The intermediate result 413 is fed back into the reduction circuit 404.

In the meantime, the multiplier circuit 402 receives the second pair of numbers (C and D) and creates partial products and forwards them to the reduction circuit 404. An additional operand F, which may be the result of another multiplication, is received and will be added to the product of C and D In exemplary embodiments, operand F, along with the first sum value and the first carry value, is directly added to the reduction circuit 404 and reduced together with the partial products of C×D to calculate a second sum value and a second carry value. The second sum value and the second carry value are transmitted to the adder circuit 406, which adds the second sum value and the second carry value to create the result value. In exemplary embodiments, the post-processing circuit 410, such as a normalizing and rounding circuit, that receives the final result. In exemplary embodiments, the post-processing circuit 410 receives the final result in a 128-bit format from the adder circuit 206 and creates two 64-bit values that each represent one part of the result.

In exemplary embodiments, the multiplier 400 can be a fused multiply-add circuit that receives a third input signal 414 that is a number to be added to the product of the numbers received via the two input signals 411. For example, the multiplier 400 shown in FIG. 4 is configured to calculate a result R that is defined as R=A×B+C×D+E+F. The multiplier circuit first calculates an intermediate value I that is defined as I=A×B+E, which is then fed back into the multiplier which computes the result R by C×D+F+I.

In exemplary embodiments, the multiplier circuit 402 is a Booth multiplier and includes logic to remove carry variables added by the Booth Multiplier during the creation of the reduction tree. Multiplier circuit designs used in modern microprocessors use Booth recoding for the generation of the partial products in order to reduce the number of partial products and thus the depth of the reduction tree. In a Booth multiplier, an additional carry_out of the reduction tree is generated by the booth encoding, which has to be removed by logic. In addition, when the intermediate result is fed back into the multiplier the additional carry_out bit may be re-inserted into the reduction tree and must be handled later.

Accordingly, the carry_out bits need to be counted during partial product reduction in order to keep track of the bits added. In general, there are three cases, depending on the number N of carry_out bits from the reduction tree for the first multiplication. The first case, in which N=0, there will be a carry_out in the representation of the first product, which has to be suppressed in addition to the suppressed carry_out from the second product. In the second case, where N=1, there can be another carry_out in the redundant representation of the first product and if the carry_out in the first cycle is suppressed, one more carry_out in the second cycle must also be suppressed. In the third case, where N=2, there is no carry_out in the redundant representation of the first product and the carry_out from the first product is carried over into the second product.

In exemplary embodiments, large integer multiplication can be performed by feeding back previously calculated products, i.e., the sum value and the carry value 413, into the reduction circuit 404, while they are still in redundant number format, to be reduced with the next product that is calculated. By feeding the intermediate multiplication result in redundant format back into the product tree and reducing them together with the partial products of the next product, the need to perform an addition to get the final result and do further processing steps like rounding is eliminated. As a result, the latency of computing and summing up a number of N products can be reduced by (N−1) times the latency of the adder circuit 406 and (N−1) times the latency of other post processing steps, e.g. rounding.

Figure 5:
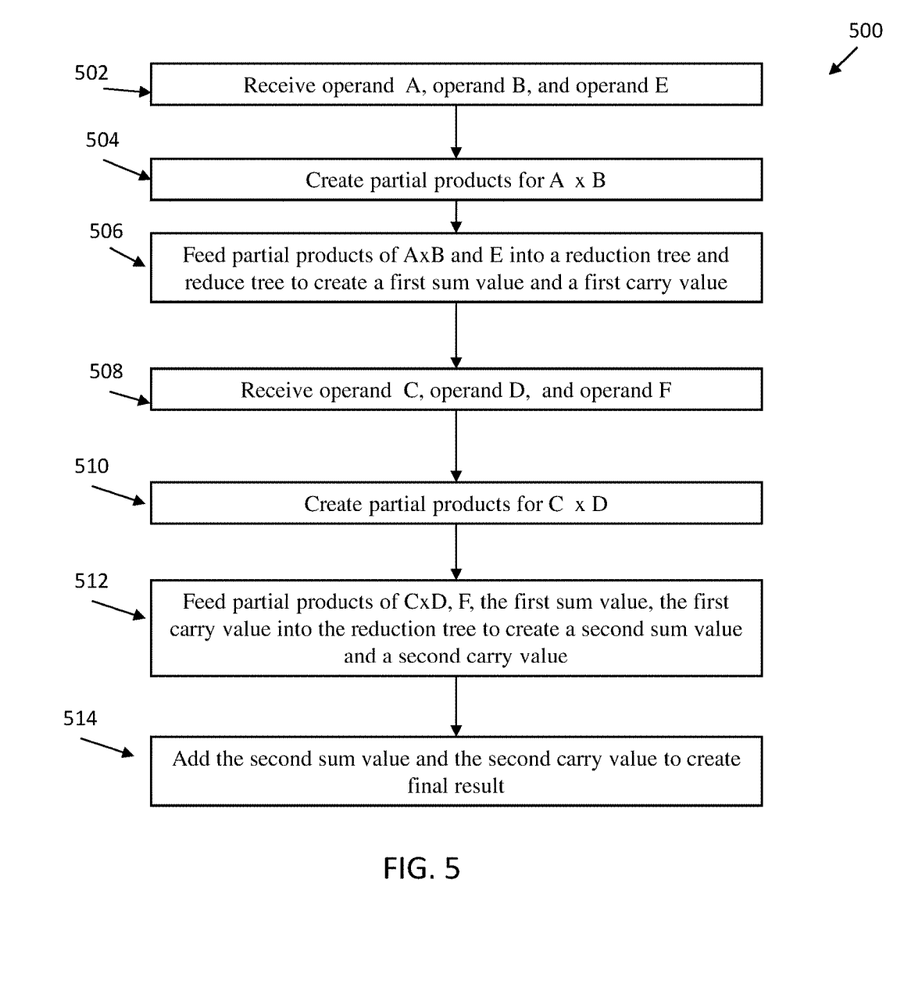
FIG. 5 shows a flow chart illustrating a method for computing and summing up multiple products in a single multiplier in accordance with an embodiment.

Referring now to FIG. 5, a method 500 for computing and summing up multiple products in a single multiplier is shown. As shown at block 502, the method 500 includes receiving, by a multiplier circuit, a first number (Operand A) and a second number (Operand B) to be multiplied and optionally a third number (Operand E) to be added to the product of the first number and the second number. Next, as shown at block 504, the method 500 includes calculating, by the multiplier circuit, the partial products of the first number and the second number. The method 500 also includes feeding the partial products and optionally the third number into a reduction tree and reducing the reduction tree to create an intermediate result consisting of a first sum value and a second sum value, as shown at block 506. In exemplary embodiments, the reduction tree created is a Wallace tree.

Next, as shown at block 508, the method 500 includes receiving, by the multiplier circuit, a fourth number (Operand C) and a fifth number (Operand D) and optionally a sixth number (Operand F) to be added to the product of the fourth number and the fifth number. The method 500 also includes calculating, by the multiplier circuit, the partial products of the fourth number and the fifth number, as shown at block 510. Next, as shown at block 512, the method 500 includes inputting the partial products of the fourth number and the fifth number, the sixth number, the first sum value and the first carry value into the reduction tree and reducing the reduction tree to create a second sum value and a second carry value. As shown at block 514, the method 500 includes adding, by an adder circuit, the second sum value and the second carry value to create a result, as shown at block 514. In exemplary embodiments, further post processing steps like normalizing and rounding may be applied before providing the result. In other embodiments, the final result may be split into two or more parts and returned using consecutive clock cycles In one embodiment, the multiplier circuit may be implemented as Booth Multiplier that includes logic to count and remove carry bits added by the Booth Multiplier during the creation of partial products. In one embodiment, the product reduction tree is implemented as a Wallace tree.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for computing and summing up multiple products in a single multiplier, the method comprising:
   receiving, by a multiplier circuit during a first clock cycle, a first number and a second number;
   creating, by the multiplier circuit during a second clock cycle, first partial products of the first number and the second number based on a multiplication of the first number and the second number;
   reducing, by a reduction circuit during a third clock cycle, the number of first partial products to create an intermediate result having a first sum value and a first carry value, and outputting the intermediate result as input to the reduction circuit;
   receiving, by the multiplier circuit during the second clock cycle, a third number and a fourth number;

creating, by the multiplier circuit during the third clock cycle, second partial products of the third number and the fourth number based on a multiplication of the third number and the fourth number;

reducing, by the reduction circuit during a fourth clock cycle, the number of second partial products and the intermediate result to create a second sum value and a second carry value; and adding, by an adder circuit, the second sum value and the second carry value to create a result.

2. The method of claim 1, wherein the multiplier circuit is a Booth Multiplier.

3. The method of claim 2, wherein the multiplier circuit includes logic to count and remove carry bits added by the Booth Multiplier during creation of the first partial products and second partial products.

4. The method of claim 1, wherein the reduction tree is a Wallace tree.

5. A multiplier for computing and summing up multiple products comprises:

a multiplier circuit that receives, during a first clock cycle, a first number and a second number and responsively creates during a second clock cycle, first partial products based on a multiplication of the first number and the second number;

a reduction circuit that reduces, during a third clock cycle, the first partial products to create an intermediate result having a first sum value and a first carry value, wherein the reduction circuit outputs the intermediate result as input to the reduction circuit;

wherein the multiplier circuit receives, during the second clock cycle, a third number and a fourth number and responsively creates, during the third clock cycle, second partial products based on a multiplication of the third number and the fourth number;

wherein the reduction circuit, during a fourth clock cycle, adds the intermediate result and the second partial products of the third number and the fourth number to create a second sum value and a second carry value; and an adder circuit that adds the second sum value and the second carry value to create a result.

6. The multiplier of claim 5, wherein the reduction tree is a Wallace tree.

7. The multiplier of claim 5, wherein the multiplier circuit is a Booth Multiplier.

8. A multiplier for computing and summing up multiple products comprises:

a Booth multiplier circuit that receives, during a first clock cycle, a first number and a second number and responsively creates, during a second clock cycle, first partial products based on a multiplication of the first number and the second number;

a reduction circuit that reduces, during a third clock cycle, the first partial products to create an intermediate result which includes a first sum value and a first carry value, wherein the Booth multiplier circuit includes logic to count and remove carry bits added by the Booth Multiplier during creation of the partial products, wherein the reduction circuit also receives a fifth number during the first clock cycle and wherein the reduction circuit creates the intermediate result based on adding the fifth number to the first partial products;

wherein the Booth multiplier circuit receives, during the second clock cycle, the intermediate result, a third number and a fourth number and responsively creates, during the third clock cycle, second partial products based on a multiplication of the third number and the fourth number;

wherein the reduction circuit adds, during a fourth clock cycle, the intermediate result, the first sum value and the first carry value, to the second partial products of the third number and the fourth number to create a reduction tree and reduces the reduction tree to a two-level tree resulting in a second sum value and a second carry value;

wherein the reduction circuit also receives a sixth number during the second clock cycle and wherein the reduction circuit includes the sixth number in the reduction of the reduction tree to the two-level tree;

an adder circuit that adds the second sum value and the second carry value to create a result.

9. The multiplier of claim 8, wherein the reduction tree is a Wallace tree.

* * * * *